(12) United States Patent
On et al.

(10) Patent No.: US 9,686,360 B2
(45) Date of Patent: Jun. 20, 2017

(54) PROTOCOLS, INTERFACES, AND PRE/POST-PROCESSING FOR ENABLING SON ENTITIES AND FEATURES IN BASE STATIONS AND WIRELESS NETWORKS

(71) Applicant: AirHop Communications, Inc., San Diego, CA (US)

(72) Inventors: Hanson On, Escondido, CA (US); Douglas McPherson, San Diego, CA (US); Zaijin Guan, San Diego, CA (US); Ramakrishna Akella, San Diego, CA (US); Hsien Woo, San Diego, CA (US); Yan Hui, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 57 days.

(21) Appl. No.: 14/293,956

(22) Filed: Jun. 2, 2014

(65) Prior Publication Data

US 2014/0355481 A1 Dec. 4, 2014

Related U.S. Application Data

(60) Provisional application No. 61/831,041, filed on Jun. 4, 2013.

(51) Int. Cl.
*H04L 29/08* (2006.01)
*H04W 28/06* (2009.01)
(Continued)

(52) U.S. Cl.
CPC ............. *H04L 67/12* (2013.01); *H04W 24/02* (2013.01); *H04W 72/00* (2013.01); *H04W 28/06* (2013.01); *H04W 88/08* (2013.01)

(58) Field of Classification Search
CPC ..... H04W 16/18; H04W 24/02; H04W 24/04; H04W 24/10; H04W 28/06; H04W 28/08;
(Continued)

(56) References Cited

U.S. PATENT DOCUMENTS 5,751,914 A 5/1998 Coley et al.
6,286,052 B1 9/2001 McCloghrie et al.
(Continued)

*Primary Examiner* — Michael Thier
*Assistant Examiner* — Eric Nowlin
(74) *Attorney, Agent, or Firm* — Van Pelt, Yi & James LLP

(57) ABSTRACT

LTE and HSPA/UMTS deployments are trending towards high density, heterogeneous and ad-hoc deployments. These deployments can be managed through Self-Organizing Network (SON) schemas. Enabling SON generally involves the introduction of new software and/or hardware entities into the network that can interact with existing base station and network entities (e.g., Enhanced Packet Core, Element Management System, and/or other network entities). In one embodiment, these interactions include the development and deployment of interfaces (e.g., APIs) and protocols between the SON entities and various network entities. For example, data collected on either side of an interface or protocol can be post-processed before consumption (e.g., for both data integrity purposes as well as bandwidth reduction purposes). As described herein, a full set of such interfaces and protocols with specific examples are disclosed to illustrate various techniques for providing protocols, interfaces, and pre/post-processing for enabling SON entities and features in base stations and wireless networks.

8 Claims, 7 Drawing Sheets

(51) Int. Cl.
*H04W 72/00* (2009.01)
*H04W 88/08* (2009.01)
*H04W 24/02* (2009.01)

(58) Field of Classification Search
CPC . H04W 36/0061; H04W 36/30; H04W 72/00; H04W 84/18; H04W 88/08; H04W 24/08; H04W 36/0083; H04L 41/08; H04L 41/0803; H04L 41/0816; H04L 41/082; H04L 41/0823; H04L 41/0886; H04L 41/0893; H04L 41/145; H04L 41/20; H04L 43/06; H04L 67/12

See application file for complete search history.

(56) References Cited

U.S. PATENT DOCUMENTS

| | | | | |
|---|---|---|---|---|
| 8,417,246 | B2* | 4/2013 | Olofsson | H04W 24/08 455/436 |
| 8,983,453 | B1* | 3/2015 | On | H04W 24/02 370/252 |
| 9,301,165 | B2* | 3/2016 | Yang | H04W 24/02 |
| 9,380,639 | B2* | 6/2016 | On | |
| 9,572,051 | B2* | 2/2017 | Tarlazzi | H04B 17/19 |
| 2004/0037319 | A1* | 2/2004 | Pandya | H04L 29/06 370/469 |
| 2005/0090201 | A1 | 4/2005 | Lengies et al. | |
| 2008/0043658 | A1* | 2/2008 | Worrall | H04W 72/005 370/312 |
| 2008/0175163 | A1 | 7/2008 | Honary et al. | |
| 2008/0253395 | A1* | 10/2008 | Pandya | H04L 29/06 370/469 |
| 2010/0232318 | A1* | 9/2010 | Sarkar | H04W 28/18 370/254 |
| 2011/0045835 | A1* | 2/2011 | Chou | H04L 41/0806 455/446 |
| 2012/0002557 | A1* | 1/2012 | Sedlar | H04L 41/0836 370/252 |
| 2012/0264470 | A1 | 10/2012 | Bajj et al. | |
| 2013/0088983 | A1 | 4/2013 | Pragada et al. | |
| 2013/0189996 | A1* | 7/2013 | Sridhar | H04W 36/0083 455/444 |
| 2013/0331079 | A1* | 12/2013 | Racz | H04W 24/02 455/418 |
| 2014/0369336 | A1* | 12/2014 | Prakash | H04W 24/02 370/338 |
| 2015/0031354 | A1* | 1/2015 | Nuss | H04L 41/08 455/424 |
| 2015/0043386 | A1* | 2/2015 | Racz | H04L 41/044 370/255 |
| 2015/0043432 | A1* | 2/2015 | Zou | H04W 24/02 370/328 |
| 2015/0092744 | A1* | 4/2015 | Singh | H04W 36/22 370/331 |
| 2015/0223287 | A1* | 8/2015 | On | H04W 24/02 370/254 |
| 2015/0296386 | A1* | 10/2015 | Menon | H04W 16/14 370/241.1 |
| 2016/0014618 | A1* | 1/2016 | Yang | H04W 24/02 370/254 |
| 2016/0248632 | A1* | 8/2016 | Nuss | H04L 41/08 |
| 2016/0255514 | A1* | 9/2016 | Kim | H04L 61/2023 370/254 |
| 2016/0353291 | A1* | 12/2016 | Tarlazzi | H04B 17/19 |
| 2017/0064642 | A1* | 3/2017 | Tarlazzi | H04B 17/19 |

* cited by examiner

PROTOCOLS, INTERFACES, AND PRE/POST-PROCESSING FOR ENABLING SON ENTITIES AND FEATURES IN BASE STATIONS AND WIRELESS NETWORKS

CROSS REFERENCE TO OTHER APPLICATIONS

This application claims priority to U.S. Provisional Patent Application No. 61/831,041 entitled PROTOCOLS, INTERFACES, AND PRE/POST-PROCESSING FOR ENABLING SON ENTITIES AND FEATURES IN BASE STATIONS AND WIRELESS NETWORKS filed Jun. 4, 2013, which is incorporated herein by reference for all purposes.

BACKGROUND OF THE INVENTION

Long-Term Evolution (LTE) and Universal Mobile Telecommunications System (UMTS)/High Speed Packet Access (HSPA) deployments are likely to be dense and with smaller cells than prior radio access technologies. Self-Organizing Network (SON) schemas (e.g., algorithms and architectures) can facilitate these wireless network deployments.

BRIEF DESCRIPTION OF THE DRAWINGS

Various embodiments of the invention are disclosed in the following detailed description and the accompanying drawings.

DETAILED DESCRIPTION

Figure 1:
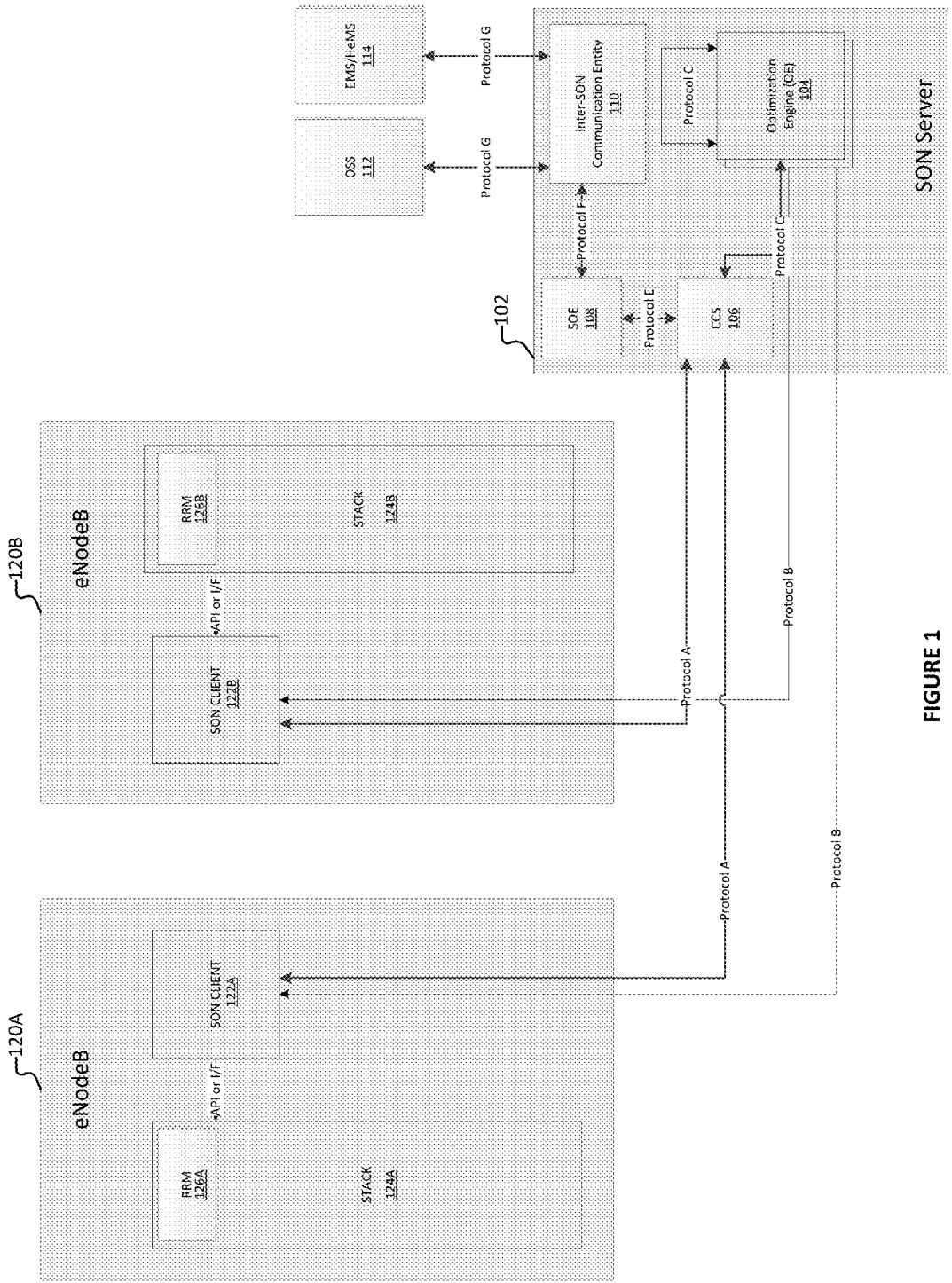
FIG. 1 is a functional block diagram that illustrates a centralized SON architecture showing the API and Protocols A and B in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Long-Term Evolution (LTE) and Universal Mobile Telecommunications System (UMTS)/High Speed Packet Access (HSPA) deployments are likely to be dense and with smaller cells (e.g., femtocells, picocells, and/or microcells in a heterogeneous wireless network (HetNet)) than prior radio access technologies (e.g., macrocells). Self-Organizing Network (SON) schemas (e.g., algorithms and architectures) can facilitate these wireless network deployments.

However, enabling these SON features requires proper interfaces (e.g., Application Programming Interfaces (APIs)), pre-/post-processing of data, and protocols between base stations (e.g., 3G and 4G base stations) and network entities on the one hand and the SON entities on the other.

Accordingly, various techniques for providing protocols, interfaces, and pre/post-processing for enabling SON entities and features in base stations and wireless networks are disclosed.

The introduction of Self-Organizing Network (SON) concepts into the deployment, maintenance, and run-time optimization of heterogeneous wireless networks, such as 3G/4G cellular networks and Wi-Fi networks, brings with it new software components and hardware components. For example, these components can be installed in existing hardware or as new network components.

In the case of software components, such software components can be co-located with existing network elements, such as NodeB (e.g., also known as Node B, which is a term generally used in UMTS Terrestrial Radio Access (UTRA) of UMTS equivalent to the BTS (Base Transceiver Station) description of that element as used in GSM), eNodeB (e.g., also known as Evolved Node B or eNB, which is the element in E-UTRA of LTE that is the evolution of the element Node B in UTRA of UMTS), Access Points (e.g., a wireless Access Point (AP), such as a Wi-Fi access point or an access point that is compatible with other wireless protocols), Enhanced Packet Core (EPC), or Gateways. The network elements NodeB, eNodeB, and Access Points are also interchangeably referred to herein as base stations.

If such software components are co-located, these software components generally utilize a way of interfacing with the existing software in the network elements. This is typically implemented using an interface, such as an Application Programming Interface (API) or other types of interfaces, such as described below.

For example, in the case of a NodeB, an eNodeB, or an Access Point, a SON client can be instantiated (e.g., a SON client can be implemented as software, such as a software object or agent, executed as a process on a processor of such network element, or in some implementations, a SON client can be implemented in programmable hardware, such as an Application-Specific Integrated Circuit (ASIC) or Field-Programmable Gate Array (FPGA)) and can function as a gateway for the SON components to collect data from and to give directions (e.g., commands or instructions) to the base station. Specifically, the interface between the SON client and a stack of the base station (e.g., in which the stack (software) of the base station can include a Radio Resource Manager (RRM) and/or other components in the base station stack software) can be used to perform, for example, one or more of the following operations:

a. Set or get layer 1 or physical layer parameters, such as transmission power;
b. Set or get layer 2 or Media Access Control (MAC) layer parameters, such as scheduler type;
c. Set or get layer 3 or signaling layer parameters, such as parameters to configure the Radio Resource Configuration (RRC) messages;
d. Set parameters to configure measurement events (e.g., periodic measurement report configuration) or other network specific events (e.g., parameters for the A1/A2/A3/A4/A5 events in LTE);
e. Set or get Management Information Block (MIB) parameters; and
f. Set optimization constraints to constrain the behavior of the network element in a way that both the network element and the overall network benefit (e.g., in order to facilitate an improvement to a particular cost metric).

An embodiment of such an interface can be implemented as an API, such as the example set of APIs described in Appendix A. Specifically, these APIs can be used to exchange data from the SON client to the stack and/or from the stack to the SON client on a base station, and the data being exchanged in both directions is described in Appendix A. In particular, as shown in Appendix A, each of these APIs is specified by an API name and corresponding parameter names that can be used for such exchanges of data between these two components on the base stations to facilitate various operations, such as described above and as further described below and in Appendix A. The example APIs described in Appendix A are for illustration purposes, and any actual implementation can be broader in terms of information exchanged between the network elements (e.g., NodeB, eNodeB, Wi-Fi access point, and/or other network elements) and the SON client as will now be apparent to one of ordinary skill in the art in view of the various embodiments disclosed herein.

In one embodiment, the stack can convey various parameters (e.g., report TX power, report new neighbor indications, and or various other parameters) to the SON Client. These are provided as examples. The extended list can include, for example, many other parameters, such as eNodeB location details, eNodeB load, handoff statistics and handoff KPI (e.g., radio link failures, ping-pong handoffs), uplink Physical Random Access Channel (e.g., generally referred to as PRACH in LTE context) statistics, and/or various other parameters.

In one embodiment, the stack can also convey various measurement reports to the SON client. These are provided as examples. The extended list can include, for example, event reports (e.g., A1, A2, A3, A4, and A5), measurements on User Equipment (UE) specific reference signals, measurements related to Multiple-Input and Multiple-Output (MIMO) reference signals, and/or various other measurement reports.

In one embodiment, the SON client can convey parameters to the stack (e.g., set TX power). These are provided as examples. The extended list can include, for example, eNodeB identifiers (e.g., generally referred to as PCI in the LTE context), antenna configuration information (e.g., antenna tilts), MIMO configuration information, and/or various other parameters (e.g., including various other configuration information, such as for measurement reporting and/or event reporting).

In one embodiment, the SON client can also convey constraints to the stack (e.g., a subband mask that conveys to the eNodeB which subband can be used until the next update/subband mask command). These are provided as examples. The extended list can include, for example, subband masks that are not just ON/OFF per subband but include TX power level on a per subband basis, handoff constraints, such as cell-specific offsets, random access channel (e.g., generally referred to as PRACH in the LTE context) configuration constraints (e.g., maximum preamble retransmission count, delta step), quality of service (QoS) constraints such as maximum guaranteed bit rates, and/or various other parameters.

In one embodiment, the exchange of the information (e.g., including parameters for information, parameters for configuration, and/or parameters for reporting, etc.) between the SON client and the stack can similarly be implemented through function calls.

In one embodiment, the exchange of information (e.g., including parameters for information, parameters for configuration, and/or parameters for reporting, etc.) between the SON client and the stack can similarly be implemented through message passing, signaling, or mailboxes between the communicating entities.

In one embodiment, this example API (e.g., or set of APIs) is an example of a programmatic interface for inter-component function calls between SON clients with a software stack on base stations, including the Radio Resource Module (RRM) (e.g., and, in some cases, also with an integrated optimization engine component performed on the base stations, such as further described below with respect to FIGS. 3 and 4), such as further described below with respect to FIGS. 1-4.

FIG. 1 is a functional block diagram that illustrates a centralized SON architecture showing the API and Protocols A and B in accordance with some embodiments. In particular, an example of such an API or Interface (I/F) is shown in FIG. 1. The software entity, as executing on each eNodeB, is shown as stack 124A of eNodeB 120A and shown as stack 124B of eNodeB 120B, in which each stack includes a Radio Resource Manager (RRM) component, shown as 126A and 126B, respectively. The SON entity, as executing on each eNodeB, is shown as SON client 122A of eNodeB 120A and shown as SON client 122B of eNodeB 120B. As also shown, each of these SON clients is in communication with the stack components on the eNodeB via APIs or other interfaces (I/F), such as the APIs described in Appendix A and as discussed above.

In some cases, the SON entities (e.g., SON clients 122A and 122B) residing on edge network elements (e.g., base stations, such as eNodeBs 120A and 120B) can communicate with other edge elements or with a centralized SON entity element(s) through agreed upon protocols. For example, the SON entity on the edge element can register with a SON server and receive configuration data from the SON server prior to start of operations. For instance, the SON clients can also implement Protocol A, such as disclosed herein.

FIG. 1 also shows a SON server 102 in communication with eNodeB 120A and eNodeB 120B via various protocols. For example, SON server 102 includes an Optimization Engine (OE) 104 (e.g., implemented as a Cell Optimization Engine (COE) component that can be executed on a processor of the SON server, or this component can be implemented in programmable hardware) that is in communication with the SON client components (122A and 122B) on eNodeB 120A and eNodeB 120B using Protocol A. Specifically, Protocol A is a protocol that can be used for initial start-up and configuration data exchange between the OE and the SON client components. For example, Protocol A can be implemented as a COE Control Protocol (CCP) over the Transport Control Protocol (TCP) (e.g., or over another transport protocol). An embodiment of Protocol A is described in Appendix B. This is an example of a broader set of possible messages and message exchange sequences that can be defined by such a COE Control Protocol to facilitate such initial start-up and configuration data exchange between the OE and the SON client components.

Once the SON entity (e.g., SON client) is initially configured, for each edge element (e.g., or groups of elements), the SON server can instantiate processing elements on the server side. These processing elements, such as OE 104, which is shown in FIG. 1 as multiple instances of the OE (e.g., for implementing base station specific Optimization Engines (OEs) that can be executed on a processor of the SON server), can perform various joint coordination algorithms (e.g., load balancing and/or other coordination algorithms) and also implement Protocol A, such as disclosed herein.

In one embodiment, the SON client on the edge element (e.g., base station) is able to communicate with SON server elements, shown as Optimization Engines (OEs) 104 in FIG. 1, and either forwards the data collected on the interface (e.g., from the stack, etc.) as is or in some post-processed form and in return receives L1/L2/L3/MIB parameters or constraints from the OEs and delivers them as is or in post-processed form from the stack (e.g., to reduce backhaul bandwidth traffic and/or to facilitate offloading some of this pre-processing and post-processing activity to the edge elements to reduce load on the SON server, as further described herein).

In one embodiment, the pre-processing or post-processing of data, in either direction, performed in the SON client, can take the form of averaging over multiple samples, grouping data, creating differential data, or time delivery as examples of many forms of pre-processing or post-processing that can be performed using the various techniques described herein. For example, the pre-processing or post-processing can be implemented in a way to reduce the protocol data exchange and reduce the burden on the backhaul and utilize less bandwidth.

As also shown in FIG. 1, OE 104 is in communication with the SON clients 122A and 122B using a Protocol B, which is a protocol that can be used for a client server architecture or the centralized architecture of SON as shown in FIG. 1. For example, Protocol B can be implemented as a Cell SON Link Protocol (CSLP) over the Transport Control Protocol (TCP) (e.g., or over another transport protocol). An embodiment of Protocol B is described in Appendix C. This is an example of a broader set of possible messages and message exchange sequences that can be defined by such a CSLP to facilitate operational and configuration data exchange between the OE executed on the SON server and the SON client components executed on base stations (e.g., communication of pre-processed or post-processed data between the SON client and the Optimization Engines (OEs) executed on the SON server and of parameters and constraints for communication to the stack of the base station). For instance, the SON clients and the SON server can each implement Protocol B, such as disclosed herein.

As also shown in FIG. 1, instances of OE 104 are in communication with other instances of OE 104 using a Protocol C, which is a protocol that can be used for inter OE communication as shown in FIG. 1. For example, Protocol C can be implemented as an Inter COE Link Protocol (ICLP). An embodiment of Protocol C is described in Appendix D. This is an example of a broader set of possible messages and message exchange sequences that can be defined by such an ICLP to facilitate configuration and measurement/reporting data exchange between different instances of OEs (e.g., such as messages to exchange transmit (TX) power between peer OEs, to exchange neighbor information, to exchange optimization parameters, and/or various other data/information as further described in Appendix D). For instance, the instances of OEs can each implement Protocol C, such as disclosed herein.

As also shown in FIG. 1, instances of OE 104 are in communication with SON clients 122A and 122B via a COE Control Server (CCS) component 106 (e.g., executed on a processor of the SON server, or this component can be implemented in programmable hardware) using a Protocol A which is a protocol that can be used for COE control-related communications as shown in the centralized SON architecture of FIG. 1. For example, Protocol A can be implemented as a Cell Control Protocol (CCP) over the Transport Control Protocol (TCP) (e.g., or over another transport protocol). An embodiment of Protocol A is described in Appendix B. This is an example of a broader set of possible messages and message exchange sequences that can be defined by such a CCP to facilitate control and command data exchange between CCSs performed on a centralized SON server and SON clients performed on base stations.

As also shown in FIG. 1, COE Control Server (CCS) component 106 is in communication with SON OAM Engine (SOE) 108 using a Protocol E, which is a protocol that can be used for COE Operations, Administration, and Management (OAM) related communications as shown in the centralized SON architecture of FIG. 1 (e.g., SOE 108 can be implemented as a distinct software component that can be executed on a processor of the SON server, or this component can be implemented in programmable hardware). For example, Protocol E can be implemented as an Inter COE OAM Protocol (COP) over the User Datagram Protocol (UDP) (e.g., or over another transport protocol). An embodiment of Protocol E is described in Appendix E. This is an example of a broader set of possible messages and message exchange sequences that can be defined by such a CCP to facilitate control and command data exchange between OEs performed on a centralized SON server and SON clients performed on base stations.

As also shown in FIG. 1, SOE 108 is in communication with an Inter-SON Communication Entity 110 using a Protocol F as shown in the centralized SON architecture of FIG. 1. For example, Protocol F can be implemented using JavaScript Object Notation (JSON) (e.g., or another service/remote procedure protocol) over TCP (e.g., or over another transport protocol) for communication of service descriptions, such as requests and responses.

As also shown in FIG. 1, Inter-SON Communication Entity 110 is in communication with Operations Support System (OSS) 112 and Element Management System/Home Element Management System (EMS/HeMS) 114 using a Protocol G as shown in the centralized SON architecture of FIG. 1. For example, Protocol G can be implemented using HyperText Transfer Protocol (HTTP) (e.g., or another session protocol) over TCP (e.g., or over another transport protocol) for communication between the SON server and other network elements (e.g., northbound network elements), such as the OSS and the EMS. Specifically, certain parameters collected by the SON server, such as UE measurements (e.g., RSRP, RSRQ, and/or other UE measurements) and channel quality information (e.g., CQI) that are only collected by the SON server, can be communicated to the OSS and the EMS using Protocol G for consumption and processing by algorithms and functions performed by the OSS and the EMS, respectively. Also, the SON server can communicate configuration and control data to the OSS and EMS using Protocol G, and the OSS and the EMS can use such configuration and control data to configure and control the base stations that the OSS and EMS are responsible for configuring and controlling (e.g., in a HetNet environment).

For example, the SOE can communicate using JSON/TCP with Inter-SON Communication Entity (e.g., which can be implemented as a web server component executed on the SON server) to facilitate communications with OSS and EMS using HTTP/TCP. As another example, the SOE can also be configured to communicate using JSON/TCP with Inter-SON Communication Entity (e.g., which can be implemented as a web server component executed on the SON server) to facilitate communications with a web client (not shown) using HTTP/TCP or another protocol/transport protocol (e.g., for network administrator (admin) configuration and reporting interactions with the SON server). As yet another example, the SOE can also be configured to facilitate communications with a client device (not shown) using a Command-Line Interface (CLI) or another scripting/programmatic interface (e.g., for network admin configuration and reporting interactions with the SON server). As will now be apparent to one of ordinary skill in the art in view of the embodiments described herein, this approach provides a modular component architecture that facilitates support of different management interfaces through, for example, a web client interface or a programmatic client interface, which can be processed by the SOE and/or the Inter-SON communication entity to communicate and interface with the OEs via the CCS using Protocol A as described above.

Figure 2:
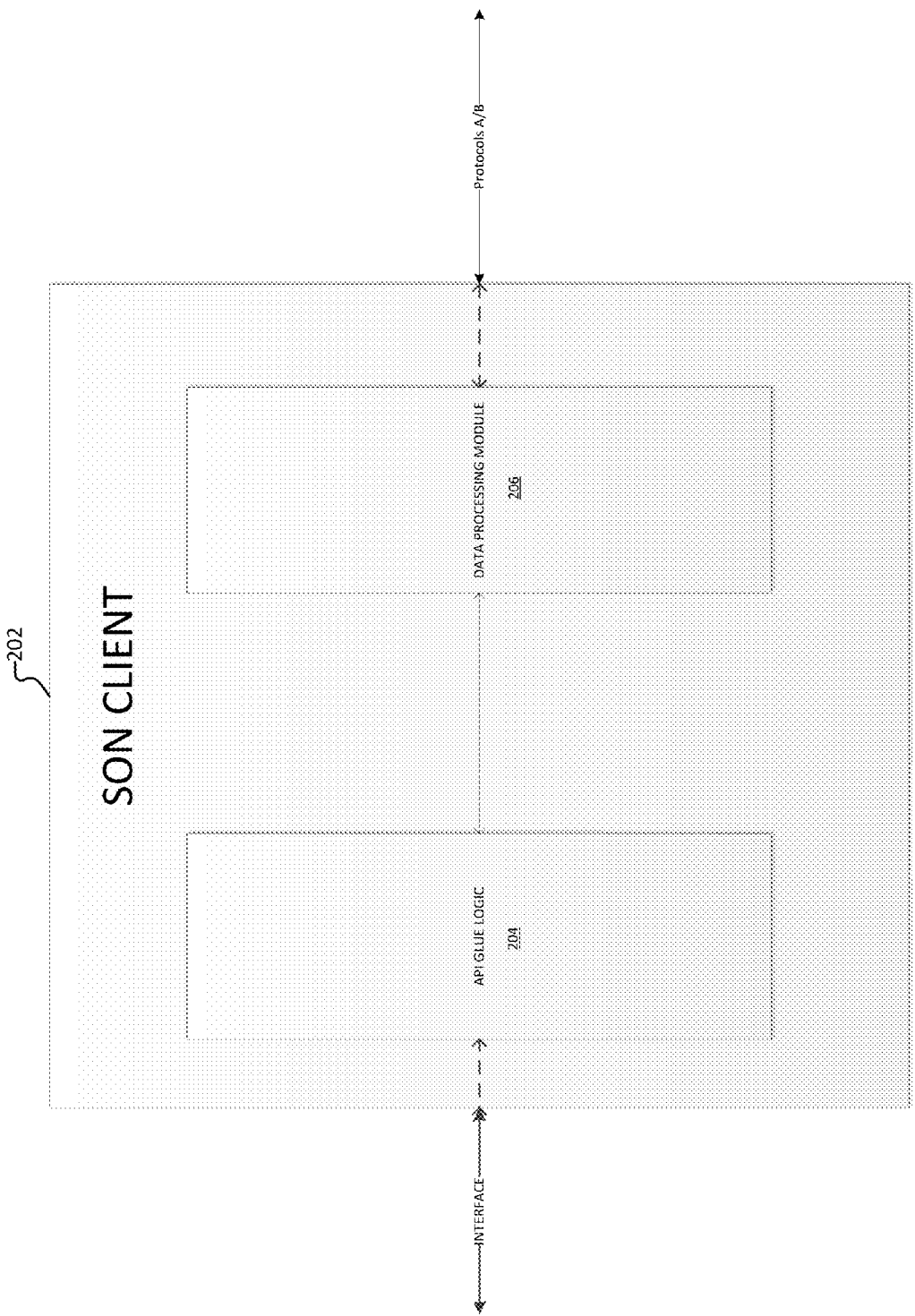
FIG. 2 is a functional block diagram that illustrates an expanded version of the SON client showing the pre-processing and post-processing unit in accordance with some embodiments.

FIG. 2 is a functional block diagram that illustrates an expanded version of the SON client showing the pre-processing and post-processing unit in accordance with some embodiments. In particular, the pre-processing and post-processing unit included in a SON client 202 is shown in the expanded view as illustrated in FIG. 2.

As shown in FIG. 2, SON client 202 supports an interface for communication with other software elements executed on the SON client (e.g., the stack of the base station, including the RRM). Specifically, SON client 202 includes an API glue logic 204 for implementing the interface, such as the above-described API detailed in Appendix A.

As also shown in FIG. 2, SON client 202 supports Protocol A and Protocol B (e.g., the SON client can implement Protocol A and Protocol B, such as described above and as detailed in Appendices B and C, respectively) for communication with the SON server. Specifically, SON client 202 includes a data processing module 206 for pre-processing data to be sent from the SON client to the SON server and for post-processing data received at the SON client from the SON server.

For example, data processing module 206 can perform low pass filtering to filter data, such as to send data less frequently (e.g., every 200 milliseconds (ms) instead of every 100 ms), send preprocessed data from the SON client to the central SON server (e.g., this approach can reduce backhaul traffic loads for centralized and/or hybrid architectures), and/or to provide data at a lower rate and/or send less granular data (e.g., an average or otherwise aggregated and/or summarized data for reporting) to reduce traffic between the base stations (e.g., eNodeB devices) and the SON server.

In another embodiment, the base station specific Optimization Engines (OEs) are integrated into each respective SON client residing on the base station itself. In this example, the data collected over the API can be directly communicated to the integrated Optimization Engine (OE) (e.g., in which the OE can be executed/performed locally by the SON client on the base station) and, in the other direction, the optimization constraints can be directly communicated to the SON client and through the API to the stack of the base station. In this embodiment, Protocol B defined above is over domain socket instead of TCP within eNodeB between the SON client and OE (e.g., in a distributed SON architecture implementation the SON client and OE are integrated in eNodeB, such as described below with respect to FIG. 3).

However, Optimization Engines (OEs) that need to communicate with each other for joint optimization can communicate with each other using Protocol C as similarly discussed above and detailed in Appendix D. An example of such a distributed SON architecture is shown in FIG. 3 as further described below.

Figure 3:
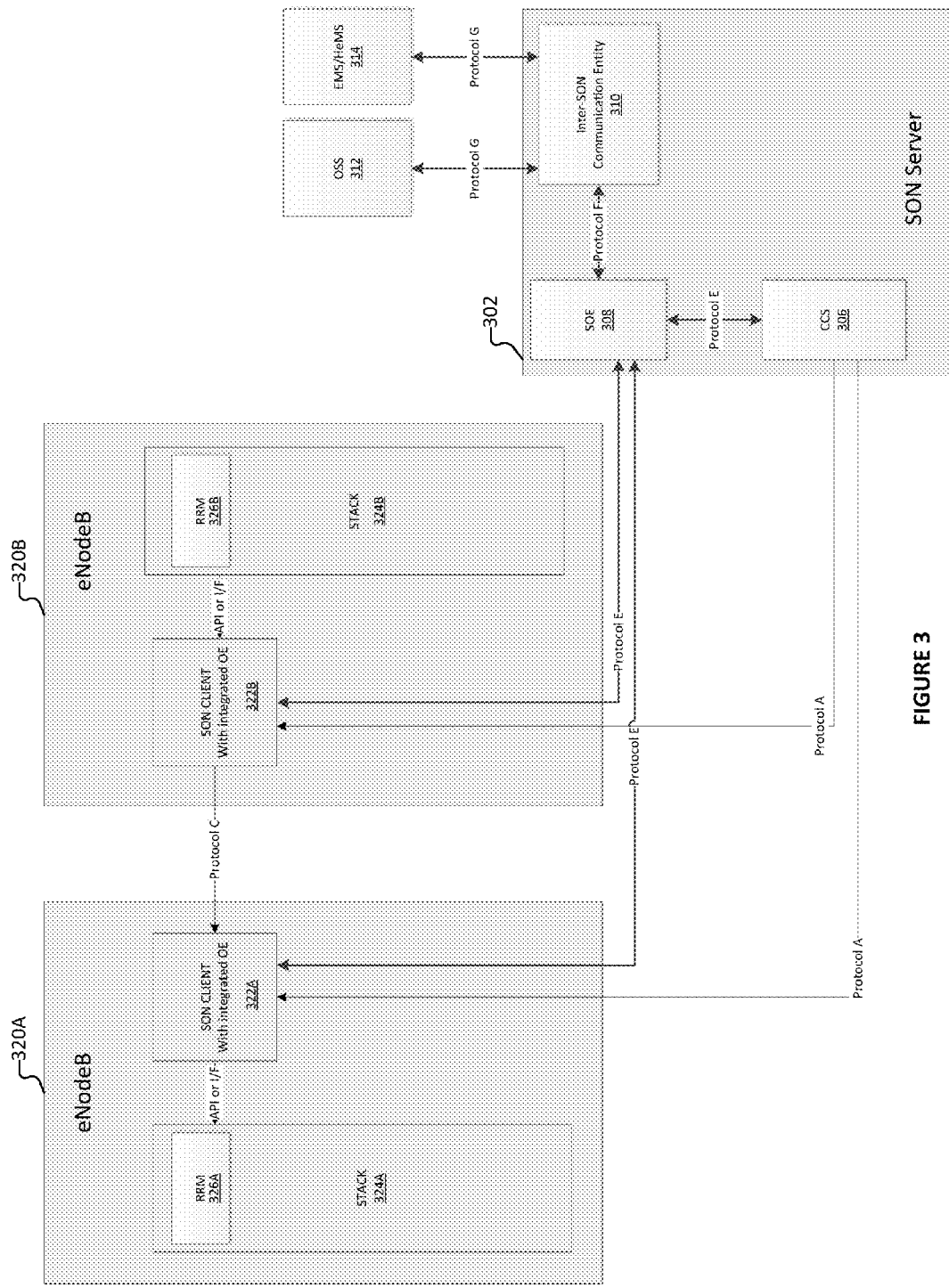
FIG. 3 is a functional block diagram that illustrates a distributed SON architecture showing the API and Protocols A and C in accordance with some embodiments.

FIG. 3 is a functional block diagram that illustrates a distributed SON architecture showing the API and Protocols A and C in accordance with some embodiments. In this example, state variables, calculated or derived values from each OE, can be shared with other OEs in the optimization clusters of the wireless network using Protocol C. The information exchanged and the message exchange sequences for Protocol C, therefore, can be different in nature than either Protocols A (e.g., initial setup, registration and configuration protocol) or Protocol B (e.g., shipping of pre-processed or post-processed data to Optimization Engines (OEs) and of parameters and constraints to the stack). In one implementation, Protocol C can be used for generic communications between SON clients with integrated optimization engines (e.g., OEs) regarding intermediate states, variables, actions, and/or other data values and commands/instructions. As similarly discussed above, an embodiment of Protocol C is described in Appendix D. This is an example of a broader set of possible messages and message exchange sequences.

Referring to FIG. 3, the software entity, as executing on each eNodeB, is shown as stack 324A of eNodeB 320A and shown as stack 324B of eNodeB 320B, in which each stack includes a Radio Resource Manager (RRM) component, shown as 326A and 326B, respectively. In this distributed SON architecture, the SON client entity, as executing on each eNodeB, is shown as SON client with integrated Optimization Engine (OE) 322A of eNodeB 320A and shown as SON client with integrated OE 322B of eNodeB 320B. As also shown, each of these SON clients is in communication with the stack components on the eNodeB via APIs or other interfaces, such as the APIs described in Appendix A and as similarly discussed above.

In some cases, the SON entities (e.g., SON clients 122A and 122B of FIG. 1) residing on edge network elements (e.g., base stations, such as eNodeBs 120A and 120B of FIG. 1) can communicate with other edge elements or with a centralized SON entity element(s) on a SON server through agreed upon protocols. For example, the SON entity on the edge element can register with a SON server and receive configuration data from the SON server prior to start of operations, such as using Protocol A described in Appendix B and as similarly discussed above. For example, the SON clients with integrated OEs can each implement base station specific Optimization Engines (OEs) (e.g., executed/performed locally on each respective base station, such as each of the eNodeBs as shown in FIG. 3) that can perform various joint coordination algorithms (e.g., load balancing and/or other coordination algorithms) in which the different SON clients with integrated OEs are in communication via Protocol C described in Appendix D and as similarly discussed above.

FIG. 3 also shows a SON server 302 in communication with eNodeB 320A and eNodeB 320B via various protocols, shown as Protocol A for communications between COE Control Server (CCS) component 306 of SON server 302 (e.g., executed on a processor of the SON server, or this component can be implemented in programmable hardware) and Protocol E for communications between CCS 306 and SON OAM Engine (SOE) 308, in which each of these protocols is similarly discussed above with respect to FIG. 1.

In one embodiment, the SON client with integrated OE on the edge element (e.g., base station) is able to communicate with these elements on the SON server, shown as CCS 306 and SOE 308 in FIG. 3, and either forwards the data collected on the interface (e.g., from the stack, etc.) as is or in some post-processed form and in return receives L1/L2/L3/MIB parameters and delivers them as is or in post-processed form from the stack (e.g., to reduce backhaul bandwidth traffic and/or to facilitate offloading some of this post-processing activity to the edge elements to reduce load on the SON server).

In one embodiment, the pre-processing or post-processing, in either direction, performed in the SON client with integrated OE can take the form of averaging over multiple samples, grouping data, creating differential data, or time delivery as examples of many forms of pre-processing or post-processing that can be performed using the various techniques described herein. For example, the pre-processing or post-processing can be implemented in a way to reduce the protocol data exchange and reduce the burden on the backhaul and utilize less bandwidth.

As also shown in FIG. 3, SOE 308 is in communication with an Inter-SON Communication Entity 310 using a Protocol F as similarly discussed above with respect to FIG. 1.

As also shown in FIG. 3, Inter-SON Communication Entity 310 is in communication with Operations Support System (OSS) 312 and Element Management System/Hosted Element Management System (EMS/HeMS) 314 using a Protocol G as similarly discussed above with respect to FIG. 1. As will now also be apparent to one of ordinary skill in the art, various web client and programmatic interfaces can also be supported by this modular/component-based architecture via SOE 308 and Inter-SON Communication Entity 310 as similarly discussed above with respect to FIG. 1.

In one implementation, OEs are embedded or preloaded on base stations (e.g., a SON client with integrated OE can be preinstalled or preloaded on a base station, such as an eNodeB). In some cases, these OEs are not initially activated when these base stations are deployed, but these OEs can be later activated after these base stations are deployed. This approach can be advantageous for use cases in which network providers do not want to initially activate these OEs in the deployed eNodeBs but can later transition from a centralized mode to a hybrid and/or distributed mode of operation, as further discussed below.

As an example use case scenario, eNodeB devices can be deployed with local Optimization Engines (OEs), in which such local OEs are not initially activated when these eNodeB devices are initially deployed in a wireless network environment. Thus, as initially deployed, such eNodeB devices are performing in a centralized SON architecture mode, such as similarly described above with respect to FIG. 1. At a later point in time, the local OEs on each of the deployed eNodeB devices can be activated (e.g., by an activation signal that can be communicated from the SON server, such as using Protocol A to communicate with the SON client to instruct the SON client to activate its integrated OE). In this scenario, the eNodeB devices are transitioned to operate using a distributed SON architecture mode as similarly described above with respect to FIG. 3. For example, a network provider may prefer to test a SON deployment initially using a centralized SON architecture before deploying a distributed SON architecture. As another example, as a number of deployed eNodeB devices on a network increases, a network provider may desire to reduce the backhaul traffic load and can transition to a distributed SON architecture or, as another example, can transition to a hybrid SON architecture as described below with respect to FIG. 4.

Figure 4:
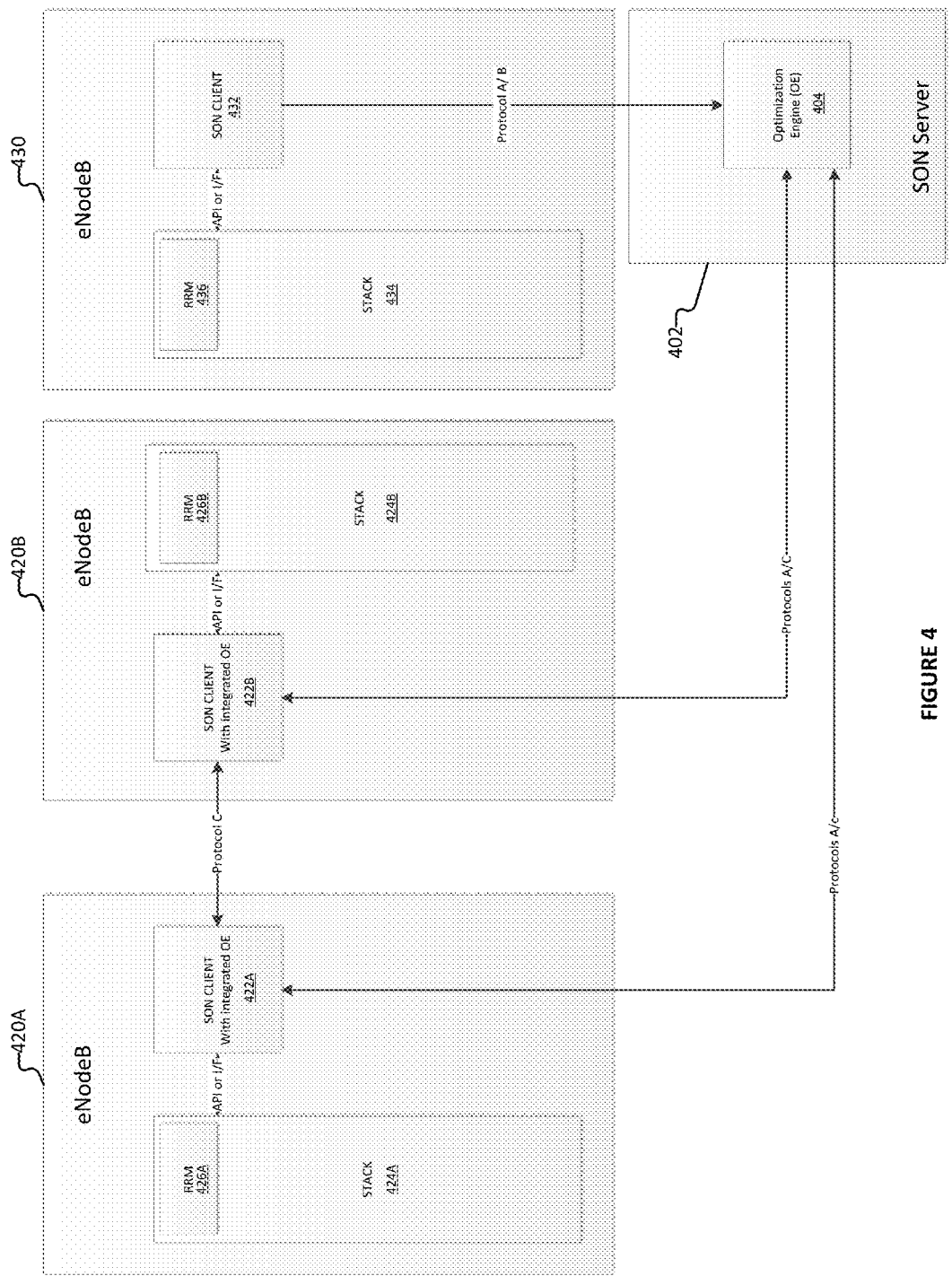
FIG. 4 is a functional block diagram that illustrates a hybrid SON architecture showing the API and Protocols A, B, and C in accordance with some embodiments.

FIG. 4 is a functional block diagram that illustrates a hybrid SON architecture showing the API and Protocols A, B, and C in accordance with some embodiments. In one embodiment, some Optimization Engines (OEs) reside along with the SON client on the Base Station (e.g., SON clients with integrated OE, such as similarly discussed above with respect to FIG. 3) and use Protocols A or C (e.g., to communicate with the SON server, as similarly discussed above with respect to FIG. 3) while other OEs are not integrated with the SON client and rather those SON clients executed on those base stations communicate with an instance of an OE executed on the SON server and use protocols A and B (e.g., for communications between such SON clients and OE instances executed on the SON server, as similarly discussed above with respect to FIG. 1). As similarly discussed above with respect to FIG. 1, OEs residing on the same server can still use Protocol C, but possibly in degenerate forms. However, they can also use Protocol C explicitly. This is referred to as a hybrid architecture and is shown in FIG. 4 as further described below.

Referring to FIG. 4, the software entity, as executing on each the eNodeBs operating in a distributed SON architecture mode, is shown as stack 424A of eNodeB 420A and shown as stack 424B of eNodeB 420B, in which each stack includes a Radio Resource Manager (RRM) component, shown as 426A and 426B, respectively. In this distributed SON architecture, the SON client entity, as executing on each eNodeB, is shown as SON client with integrated Optimization Engine (OE) 422A of eNodeB 420A and shown as SON client with integrated OE 422B of eNodeB 420B. As also shown, each of these SON clients with integrated OE 422A and 422B is in communication with the stack components on the eNodeB via APIs or other interfaces, such as the set of APIs described in Appendix A and as similarly discussed above. As similarly discussed above with respect to FIG. 3, each of these SON clients with integrated OE 422A and 422B is in communication with Optimization Engine (OE) 404 of SON server 402 using Protocol A and Protocol C.

As also shown in FIG. 4, eNodeB 430 is operating in a centralized SON architecture mode, and is shown as including a stack 434 of eNodeB 430 that includes a Radio Resource Manager (RRM) component 436. In this centralized SON architecture mode, the SON client entity, as executing on eNodeB 430 in this example, is shown as SON client 432. As also shown, SON client 432 is in communication with the stack components on the eNodeB via APIs or other interfaces, such as the set of APIs described in Appendix A and as similarly discussed above. As similarly discussed above with respect to FIG. 1, SON client 432 is in communication with Optimization Engine (OE) 404 of SON server 402 using Protocol A and Protocol B.

In one embodiment, SON server 402 also includes a CCS component, an SOE component, and an Inter-SON Communication Entity as similarly shown and described above with respect to FIGS. 1 and 3. As will now also be apparent to one of ordinary skill in the art, various web client and programmatic interfaces can also be supported via such SOE and Inter-SON Communication Entity components as similarly discussed above with respect to FIG. 1.

Figure 5:
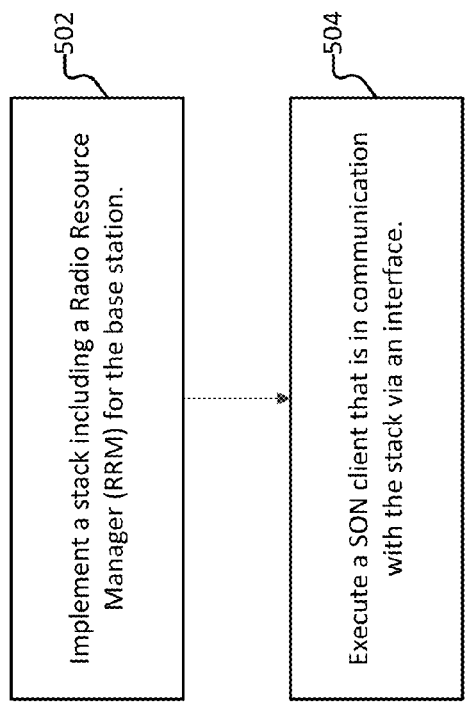
FIG. 5 is a flow diagram illustrating a process for implementing an interface for a SON client in accordance with some embodiments.

FIG. 5 is a flow diagram illustrating a process for implementing an interface for a SON client in accordance with some embodiments. In one embodiment, the process for implementing an interface for a SON client is performed using a centralized SON architecture, a distributed SON architecture, and/or a hybrid SON architecture, such as described above with respect to FIGS. 1-4.

Referring to FIG. 5, at 502, implementing a stack including a Radio Resource Manager (RRM) for a base station is performed.

At 504, executing a SON client that is in communication with the stack via an interface is performed. For example, the interface can be implemented as an application programming interface (API). For example, the API can include the APIs described in Appendix A and as discussed above.

In one embodiment, the interface includes an API for setting or requesting layer 1 or physical layer parameters.

In one embodiment, the interface includes an API for setting or requesting layer 2 or MAC layer parameters.

In one embodiment, the interface includes an API for setting or requesting layer 3 or signaling layer parameters.

In one embodiment, the interface includes an API for setting parameters to configure measurement events.

In one embodiment, the interface includes an API for setting or requesting Management Information Block (MIB) parameters.

In one embodiment, the interface includes an API for setting optimization constraints.

Figure 6:
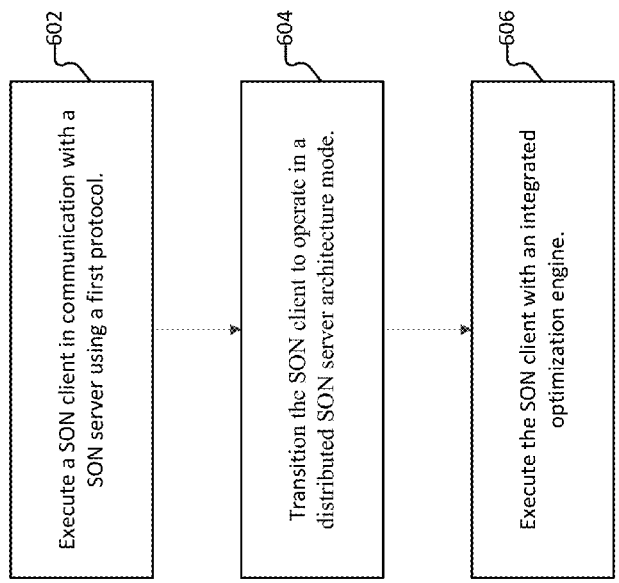
FIG. 6 is a flow diagram illustrating a process for implementing a protocol for a SON client in accordance with some embodiments.

FIG. 6 is a flow diagram illustrating a process for implementing a protocol for a SON client in accordance with some embodiments. In one embodiment, the process for implementing a protocol for a SON client is performed using a centralized SON architecture, a distributed SON architecture, and/or a hybrid SON architecture, such as described above with respect to FIGS. 1-4.

Referring to FIG. 6, at 602, executing a SON client in communication with a SON server using a first protocol is performed. For example, the SON client is initially configured to operate in a centralized SON server architecture mode.

At 604, transitioning the SON client to operate in a distributed SON server architecture mode is performed. For example, an activation signal can be communicated from the SON server to the SON client to activate an embedded Optimization Engine (OE) integrated with the SON client.

At 606, executing the SON client with an integrated Optimization Engine (OE) is performed. Specifically, the SON client with the integrated optimization engine is configured to operate in a distributed SON server architecture mode, such as described above with respect to FIG. 3.

In one embodiment, the process further includes performing various protocols to facilitate SON client and SON server communications using Protocol A and/or Protocol B as described herein and/or to facilitate inter-SON client communications using Protocol C as described herein.

Figure 7:
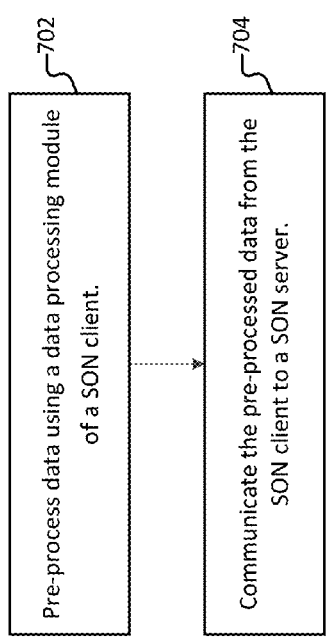
FIG. 7 is a flow diagram illustrating a process for implementing a data processing module of a SON client in accordance with some embodiments.

FIG. 7 is a flow diagram illustrating a process for implementing a data processing module of a SON client in accordance with some embodiments. In one embodiment, the process for implementing the SON client is performed using a centralized SON architecture or a hybrid SON architecture, such as described above with respect to FIGS. 1, 2, and 4.

Referring to FIG. 7, at 702, pre-processing data using a data processing module of a SON client is performed. For example, the pre-processing data can be performed using the data processing module of the SON client as shown in and described above with respect to FIG. 2.

At 704, communicating the pre-processed data from the SON client to a SON server is performed. For example, this approach can reduce backhaul traffic loads for centralized and/or hybrid architectures.

In one embodiment, the process further includes performing low pass filtering to filter data, such as to provide data less frequently (e.g., every 200 milliseconds (ms) instead of every 100 ms, or at other time intervals).

In one embodiment, the process further includes sending data form the SON client to the SON server at a lower rate and/or sending less granular data (e.g., an average or otherwise aggregated and/or summarized data for reporting) to reduce traffic between the base station and the SON server.

Although the foregoing embodiments have been described in some detail for purposes of clarity of understanding, the invention is not limited to the details provided. There are many alternative ways of implementing the invention. The disclosed embodiments are illustrative and not restrictive.

Appendix A: APIs

| API Name | Direction | Parameter Name | Description |
| --- | --- | --- | --- |
| Initialize eNodeB Client | Stack to Client | Server Address | IP address of the SON server |
| | | Port Number | Port number of the SON server |
| | | ECGI | ECGI of the eNodeB |
| Report PS Ready | Stack to Client | ECGI | ECGI of the eNodeB |

-continued

| API Name | Direction | Parameter Name | Description |
|---|---|---|---|
| Report New UE | Stack to Client | UEID | ID of a new UE attached to a base station |
| Report UE Measurement | Stack to Client | UEID | ID of the UE sending a measurement report |
| | | Trigger Type | The trigger that caused this measurement |
| | | Event ID | The event that caused this measurement |
| | | Measurement List Size | Number of measurements in this report |
| | | Measurement List | The actual measurements in list form |
| Report New Neighbor | Stack to Client | PCI | PCI of the new neighbor |
| | | ECGI | ECGI of the new neighbor |
| Report TX Power | Stack to Client | Tx Power | Transmit power of the base station |
| Set Minimum Subbands | Stack to Client | Minimum Subbands | Minimum subbands needed to meet QoS requirements |
| Set Number of Subbands | Stack to Client | Subbands | Set the number of subbands supported by the base station |
| Remove UE | Stack to Client | UEID | ID of the UE to be removed as it has detached |
| Report RNTP | Stack to Client | ECGI | ECGI of the base station reporting this RNTP |
| | | RNTP | The actual power values |
| | | Number of PRB | Number of physical resource blocks for which this is valid |
| Report ABS Pattern | Stack to Client | ECGI | |
| | | ABS Pattern | |
| | | ABS Measurement Subset | |
| Report UE Wideband CQI | Stack to Client | UEID | ID of the UE reporting this wideband CQI |
| | | Code Block ID | |
| | | CQI | The actual CQI value |
| Finalize eNodeB Client | Stack to Client | Code | Close the client with a Code indicating reason |
| Calculate UGM | Stack to Client | | |
| Configure UE Measurement Report | Client to Stack | Trigger Type | Periodic or event triggered |
| | | Purpose | Indicates reporting for strongest cells, or reporting ECGI |
| | | EventID | Indicates Event ID, if this report is Event Triggered |
| | | Threshold | Only used for event-triggered |
| | | Hysteresis | Only used for event-triggered |
| | | Time To Trigger | Only used for event-triggered |

-continued

| API Name | Direction | Parameter Name | Description |
|---|---|---|---|
| | | Trigger Quantity | |
| | | Report Quantity | Either RSRP or RSRQ |
| | | Max Report Cells | |
| | | Report Interval | |
| | | Report Amount | |
| Set Radio Parameters | Client to Stack | TX Power | SON server updates to TX power |
| Configure Subband CQI Report | Client to Stack | Max Time Between Reports | What is the maximum time between subband CQI reports |
| | | Report Mode | Mode of reporting: Periodic or aperiodic |
| | | Report Mode Aperiodic | Aperiodic mode configuration parameter |
| | | Report Mode Periodic K | Periodic mode configuration parameter |
| Set Subband Mask | Client to Stack | Mask Size | Size of soft frequency reuse mask |
| | | Mask | Actual mask in list form |

Appendix B: Protocol A

| Message Name | Direction | Field Name | Description |
|---|---|---|---|
| RegisterCellReq | Client to eSON server | ecgi | Message to register a new cell with the eSON server |
| RegisterCellRsp | eSON server to Client | status COE_Address | Response to registration Status: To let the base station know if the registration has succeeded If Status is successful, the server returns network address of the peer Optimization Engine |
| QueryCOEAddressReq | OE to eSON server | ecgi | Message requesting a neighbor optimization engine's Network address |
| QueryCOEAddressRsp | eSON server to OE | status COE_Address | Response to address request message Status: To let the OE know if the neighbor OE has been located If Status is successful, the server returns network address of the neighbor Optimization Engine |

Appendix C: Protocol B

| Message Name | Direction | Field Name | Description |
|---|---|---|---|
| PSReadyInd | Client to eSON server | ecgi | Indicates the protocol stack is ready |
| NewUEInd | Client to eSON server | ueId | Indicates a new UE is attached |
| NewNeighborInd | Client to eSON server | pci ecgi | Indicates that a new neighbor is confirmed |
| UEMeasurementReportInd | Client to eSON server | ueId | Indicates a new UE measurement report |
| | | triggerType eventId | Similar description as in API |
| | | numMeasurement measurements | List of measurements |
| RSRPMeasurement | | ecgi rsrp | |

-continued

| Message Name | Direction | Field Name | Description |
|---|---|---|---|
| UEWidebandSINRInd | Client to eSON server | ueId codeBlockId sinr | Wideband SINR measurement report |
| UESubbandSINRInd | Client to eSON server | ueId codeBlockId numSubband sinrs | Subband SINR measurement report List of SINR |
| RemoveUECmd | Client to eSON server | ueId | Indicates a UE has detached |
| TxPowerInd | Client to eSON server | txPower | Indicates the TX power of the base station |
| RNTPInd | Client to eSON server | ecgi numPRB rntp | Details of RNTP from a neighbor Data structure to indicate RNTP |
| ABSPatternInd | Client to eSON server | ecgi absPattern[5] absMeasurementSubset[5] | Details of ABS pattern from neighbor |
| SetMinNumSubbandCmd | Client to eSON server | minNumSubband | Minimum subbands needed by this base station |
| SetNumSubbandCmd | Client to eSON server | numSubband | Number of subbands supported at this base station |
| ConfigureUEMeasurementReportCmd | eSON server to Client | | Configures how the UE measurements must be done |
| | | triggerType if(triggerType == 0) eventId threshold hysteresis timeToTrigger else purpose triggerQuantity reportQuantity maxReportCells reportInterval reportAmount | Similar as the API field If type is "EVENT" Similar as the API field Similar as the API field Similar as the API field Similar as the API field Similar as the API field Similar as the API field Similar as the API field Similar as the API field Similar as the API field |
| ConfigureSubbandCQIReportCmd | eSON server to Client | maxTimeBetweenReport reportMode if(reportMode == 0) reportModeAperiodic else reportModePeriodicK | Configuring for periodic or aperiodic reporting |
| ConfigureCQIMaskPeriodsCmd | eSON server to Client | subbandCqiReportPeriod subbandMaskRequestPeriod | Configuring the period for CQI masks in milliseconds in milliseconds |
| SetSubbandMaskCmd | eSON server to Client | numSubband subbandMask[numSubband] | Setting the subband mask constraint |
| SetRadioParametersCmd | eSON server to Client | txPower | Setting the transmission power |

Appendix D: Protocol C

| Message Name | Direction | Field Name | Description |
|---|---|---|---|
| NeighborTxPowerInd | OE to OE | txPower | Message to exchange TX power between peer OE |
| NeighborID | OE to OE | ecgi | Message to exchange neighbor ECGI identities |
| NeighborOptParam | OE to OE | | Message to exchange optimization parameters |
| | | paramType numSubband OptParam[numSubband] | Type of optimization parameter Number of subbands Optimization parameter on a subband basis |

Appendix E: Protocol E

| Message Name | Direction | Field Name | Description |
|---|---|---|---|
| OESubscribeReq | SOE to OE | Period | Message to subscribe OE information |
| OEUpdateInd | OE to SOE | | Message to exchange OE socket information |
| | | ecgi | Cell ECGI information |
| | | pci | Cell PCI information |
| | | numSubband | Cell Number of Subband |
| | | adminState | Cell Administration State |
| | | txPower | Cell TX power |

What is claimed is:

1. A system for an interface for a Self-Organizing Networks (SON) client, comprising:
a processor of a base station configured to:
implement a stack including a Radio Resource Manager (RRM) for the base station; and
execute the SON client that is in communication with the stack via the interface to collect data from and give direction to the base station, wherein the interface includes at least three of the following:
an application programming interface (API) configured to set or request layer 1 or physical layer parameters sent from the SON client to the stack, the layer 1 or physical layer parameters including set transmission (TX) power, report TX power, eNodeB identifiers, Physical Cell ID (PCI), antenna configuration information, antenna tilt, Multiple-Input and Multiple-Output (MIMO) configuration information, or any combination thereof;
an application programming interface (API) configured to set or request layer 2 or MAC layer parameters sent from the SON client to the stack, the layer 2 or MAC layer parameters including scheduler type, the MIMO configuration information, or any combination thereof;
an application programming interface (API) configured to set or request layer 3 or signaling layer parameters sent between the SON client and the stack, the layer 3 or signaling layer parameters including a Radio Resource Configuration (RRC) message, report new neighbor indication, set TX power, the eNodeB identifiers, the PCI, the MIMO configuration information, or any combination thereof;
an application programming interface (API) for setting parameters to configure measurement events sent from the stack to the SON client, the parameters to configure measurement events including parameters for A1 event, A2 event, A3 event, A4 event, A5 event, or any combination thereof, a measurement on a User Equipment (UE) specific reference signal, a measurement related to a MIMO reference signal, or any combination thereof;
an application programming interface (API) configured to set or request Management Information Block (MIB) parameters sent between the SON client and the stack; or
an application programming interface (API) configured to set optimization constraints sent between the SON client and stack, the optimization constraints including a subband mask that conveys to an eNodeB which subband to use until a next update/subband mask command, a subband mask that include TX power level on a per subband basis, a handoff constraint, a cell-specific offset, random access channel, a configuration constraint, maximum preamble retransmission count, delta step, a quality of service (QoS) constraint, a maximum guaranteed bit rate, or any combination thereof;
receive at least three of the following: the layer 1 or physical layer parameters, the layer 2 or MAC layer parameters, the layer 3 or signaling layer parameters, the parameters to configure measurement events, the MIB parameters, or the optimization constraints from an Optimization Engine (OE); and
deliver the at least three of the following: the layer 1 or physical layer parameters, the layer 2 or MAC layer parameters, the layer 3 or signaling layer parameters, the parameters to configure measurement events, the MIB parameters, or the optimization constraints from an Optimization Engine (OE) to the stack for reducing backhaul bandwidth traffic and/or facilitating offloading pre-processing and post-processing activity; and
a memory coupled to the processor and configured to provide the processor with instructions.

2. The system recited in claim 1, wherein the interface includes an application programming interface (API), and wherein the processor is further configured to:
implement the API.

3. The system recited in claim 1, wherein the interface includes at least four of the following: the layer 1 or physical layer parameters, the layer 2 or MAC layer parameters, the layer 3 or signaling layer parameters, the parameters to configure measurement events, the MIB parameters, or the optimization constraints.

4. The system recited in claim 1, wherein the interface includes at least five of the following: the layer 1 or physical layer parameters, the layer 2 or MAC layer parameters, the layer 3 or signaling layer parameters, the parameters to configure measurement events, the MIB parameters, or the optimization constraints.

5. A method of an interface for a Self-Organizing Networks (SON) client, comprising:
implementing a stack including a Radio Resource Manager (RRM) for a base station; and
executing the SON client that is in communication with the stack via the interface using a processor of a base station to collect data from and give direction to the base station, wherein the interface includes at least three of the following:
an application programming interface (API) configured to set or request layer 1 or physical layer parameters sent from the SON client to the stack, the layer 1 or physical layer parameters including set transmission (TX) power, report TX power, eNodeB identifiers, Physical Cell ID (PCI), antenna configuration information, antenna tilt, Multiple-Input and Multiple-Output (MIMO) configuration information, or any combination thereof;
an application programming interface (API) configured to set or request layer 2 or MAC layer parameters sent from the SON client to the stack, the layer 2 or MAC layer parameters including scheduler type, the MIMO configuration information, or any combination thereof;

an application programming interface (API) configured to set or request layer 3 or signaling layer parameters sent between the SON client and the stack, the layer 3 or signaling layer parameters including a Radio Resource Configuration (RRC) message, report new neighbor indication, set TX power, the eNodeB identifiers, the PCI, the MIMO configuration information, or any combination thereof;

an application programming interface (API) for setting parameters to configure measurement events sent from the stack to the SON client, the parameters to configure measurement events including parameters for A1 event, A2 event, A3 event, A4 event, A5 event, or any combination thereof, a measurement on a User Equipment (UE) specific reference signal, a measurement related to a MIMO reference signal, or any combination thereof;

an application programming interface (API) configured to set or request Management Information Block (MIB) parameters sent between the SON client and the stack; or an application programming interface (API) configured to set optimization constraints sent between the SON client and the stack, the optimization constraints including a subband mask that conveys to an eNodeB which subband to use until a next update/subband mask command, a subband mask that include TX power level on a per subband basis, a handoff constraint, a cell-specific offset, random access channel, a configuration constraint, maximum preamble retransmission count, delta step, a quality of service (QoS) constraint, a maximum guaranteed bit rate, or any combination thereof;

receiving at least three of the following: the layer 1 or physical layer parameters, the layer 2 or MAC layer parameters, the layer 3 or signaling layer parameters, the parameters to configure measurement events, the MIB parameters, or the optimization constraints from an Optimization Engine (OE); and delivering the at least three of the following: the layer 1 or physical layer parameters, the layer 2 or MAC layer parameters, the layer 3 or signaling layer parameters, the parameters to configure measurement events, the MIB parameters, or the optimization constraints from an Optimization Engine (OE) to the stack for reducing backhaul bandwidth traffic and/or facilitating offloading pre-processing and post-processing activity.

6. A computer program product for an interface for a Self-Organizing Networks (SON) client, the computer program product being embodied in a non-transitory, tangible computer readable storage medium and comprising computer instructions for:

implementing a stack including a Radio Resource Manager (RRM) for a base station; and executing the SON client that is in communication with the stack via the interface to collect data from and give direction to the base station, wherein the interface includes at least three of the following:

an application programming interface (API) configured to set or request layer 1 or physical layer parameters sent from the SON client to the stack, the layer 1 or physical layer parameters including set transmission (TX) power, report TX power, eNodeB identifiers, Physical Cell ID (PCI), antenna configuration information, antenna tilt, Multiple-Input and Multiple-Output (MIMO) configuration information, or any combination thereof;

an application programming interface (API) configured to set or request layer 2 or MAC layer parameters sent from the SON client to the stack, the layer 2 or MAC layer parameters including scheduler type, the MIMO configuration information, or any combination thereof;

an application programming interface (API) configured to set or request layer 3 or signaling layer parameters sent between the SON client and the stack, the layer 3 or signaling layer parameters including a Radio Resource Configuration (RRC) message, report new neighbor indication, set TX power, the eNodeB identifiers, the PCI, the MIMO configuration information, or any combination thereof;

an application programming interface (API) for setting parameters to configure measurement events sent from the stack to the SON client, the parameters to configure measurement events including parameters for A1 event, A2 event, A3 event, A4 event, A5 event, or any combination thereof, a measurement on a User Equipment (UE) specific reference signal, a measurement related to a MIMO reference signal, or any combination thereof;

an application programming interface (API) configured to set or request Management Information Block (MIB) parameters sent between the SON client and the stack; or an application programming interface (API) configured to set optimization constraints sent between the SON client and the stack, the optimization constraints including a subband mask that conveys to an eNodeB which subband to use until a next update/subband mask command, a subband mask that include TX power level on a per subband basis, a handoff constraint, a cell-specific offset, random access channel, a configuration constraint, maximum preamble retransmission count, delta step, a quality of service (QoS) constraint, a maximum guaranteed bit rate, or any combination thereof;

receiving at least three of the following: the layer 1 or physical layer parameters, the layer 2 or MAC layer parameters, the layer 3 or signaling layer parameters, the parameters to configure measurement events, the MIB parameters, or the optimization constraints from an Optimization Engine (OE); and delivering the at least three of the following: the layer 1 or physical layer parameters, the layer 2 or MAC layer parameters, the layer 3 or signaling layer parameters, the parameters to configure measurement events, the MIB parameters, or the optimization constraints from an Optimization Engine (OE) to the stack for reducing backhaul bandwidth traffic and/or facilitating offloading pre-processing and post-processing activity.

7. A system for a protocol for a Self-Organizing Networks (SON) client, comprising:

a processor of a base station configured to:

implement a stack including a Radio Resource Manager (RRM) for the base station; and execute a first SON client that is in communication with the stack via the interface to collect data from and give direction to the base station, wherein the interface includes at least three of the following:

an application programming interface (API) configured to set or request layer 1 or physical layer parameters sent from the first SON client to the stack, the layer 1 or physical layer parameters including set transmission (TX) power, report TX power, eNodeB identifiers, Physical Cell ID (PCI), antenna configuration information, antenna tilt, Multiple-Input and Multiple-Output (MIMO) configuration information, or any combination thereof;

an application programming interface (API) configured to set or request layer 2 or MAC layer parameters sent from the first SON client to the stack, the layer 2 or MAC layer parameters including scheduler type, the MIMO configuration information, or any combination thereof;

an application programming interface (API) configured to set or request layer 3 or signaling layer parameters sent between the first SON client and the stack, the layer 3 or signaling layer parameters including a Radio Resource Configuration (RRC) message, report new neighbor indication, set TX power, the eNodeB identifiers, the PCI, the MIMO configuration information, or any combination thereof;

an application programming interface (API) for setting parameters to configure measurement events sent from the stack to the first SON client, the parameters to configure measurement events including parameters for A1 event, A2 event, A3 event, A4 event, A5 event, or any combination thereof, a measurement on User Equipment (UE) specific reference signal, a MIMO reference signal, or any combination thereof;

an application programming interface (API) configured to set or request Management Information Block (MIB) parameters sent between the first SON client and the stack; or an application programming interface (API) configured to set optimization constraints sent between the first SON client and the stack, the optimization constraints including a subband mask that conveys to an eNodeB which subband to use until a next update/subband mask command, a subband mask that include TX power level on a per subband basis, a handoff constraint, a cell-specific offset, random access channel, a configuration constraint, maximum preamble retransmission count, delta step, a quality of service (QoS) constraint, a maximum guaranteed bit rate, or any combination thereof;

communicate, via the first SON client, with a SON server using a first protocol, wherein the first SON client is configured to operate in a centralized SON server architecture mode; and wherein the first SON client is configured to communicate with a second SON client using a second protocol, the second protocol being different from the first protocol;

transition the first SON client to operate in a distributed SON server architecture mode; and execute the first SON client with an integrated optimization engine, wherein the first SON client with the integrated optimization engine is configured to operate in the distributed SON server architecture mode; and a memory coupled to the processor and configured to provide the processor with instructions.

8. A system for implementing a data processing module of a Self-Organizing Networks (SON) client, comprising:

a processor of a base station configured to:
implement a stack including a Radio Resource Manager (RRM) for the base station; and execute the SON client that is in communication with the stack via the interface to collect data from and give direction to the base station, wherein the interface includes at least three of the following:

an application programming interface (API) configured to set or request layer 1 or physical layer parameters sent from the SON client to the stack, the layer 1 or physical layer parameters including set transmission (TX) power, report TX power, eNodeB identifiers, Physical Cell ID (PCI), antenna configuration information, antenna tilt, Multiple-Input and Multiple-Output (MIMO) configuration information, or any combination thereof;

an application programming interface (API) configured to set or request layer 2 or MAC layer parameters sent from the SON client to the stack, the layer 2 or MAC layer parameters including scheduler type, the MIMO configuration information, or any combination thereof;

an application programming interface (API) configured to set or request layer 3 or signaling layer parameters sent between the SON client and the stack, the layer 3 or signaling layer parameters including a Radio Resource Configuration (RRC) message, report new neighbor indication, set TX power, the eNodeB identifiers, the PCI, the MIMO configuration information, or any combination thereof;

an application programming interface (API) for setting parameters to configure measurement events sent from the stack to the SON client, the parameters to configure measurement events including parameters for A1 event, A2 event, A3 event, A4 event, A5 event, or any combination thereof, a measurement on a User Equipment (UE) specific reference signal, a measurement related to a MIMO reference signal, or any combination thereof;

an application programming interface (API) configured to set or request Management Information Block (MIB) parameters sent between the SON client and the stack; or an application programming interface (API) configured to set optimization constraints sent between the SON client and the stack, the optimization constraints including a subband mask that conveys to an eNodeB which subband to use until a next update/subband mask command, a subband mask that include TX power level on a per subband basis, a handoff constraint, a cell-specific offset, random access channel, a configuration constraint, maximum preamble retransmission count, delta step, a quality of service (QoS) constraint, a maximum guaranteed bit rate, or any combination thereof;

pre-process data using a data processing module of the SON client; and communicate the pre-processed data from the SON client to a SON server, comprising to:
perform a low pass filtering to filter the pre-processed data from the SON client to a SON server; and a memory coupled to the processor and configured to provide the processor with instructions.

* * * * *